(12) United States Patent
Collinucci

(10) Patent No.: US 6,336,611 B1
(45) Date of Patent: Jan. 8, 2002

(54) COLLAPSIBLE PANEL AND METHOD FOR CONTROLLED COLLAPSING THEREOF

(75) Inventor: Luciana Collinucci, Rimini (IT)

(73) Assignee: Certime Amsterdam B.V., Amsterdam (NL)

(*) Notice: Subject to any disclaimer, the term of this patent is extended or adjusted under 35 U.S.C. 154(b) by 0 days.

(21) Appl. No.: 09/854,482

(22) Filed: May 15, 2001

Related U.S. Application Data

(62) Division of application No. 09/288,498, filed on Apr. 8, 1999, now Pat. No. 6,250,412.

(30) Foreign Application Priority Data

Apr. 9, 1998 (EP) .............................................. 98106645

(51) Int. Cl.⁷ .............................. F42B 1/00; B60D 1/28
(52) U.S. Cl. .................... 244/129.4; 180/271; 180/282; 296/84.1; 52/741.1; 49/31; 72/55; 72/706; 102/306
(58) Field of Search ........................... 244/129.3, 129.4; 180/271, 282; 296/84.1; 52/741.1, 750; 225/43.5; 102/306; 49/31; 72/55, 706

(56) References Cited

U.S. PATENT DOCUMENTS

| | | | |
|---|---|---|---|
| 3,738,681 A | 6/1973 | Wade et al. ................. 180/271 |
| 3,741,583 A | 6/1973 | Usui et al. ..................... 49/31 |
| 4,301,707 A | 11/1981 | Schimmel et al. .... 244/122 AF |
| 4,637,848 A | 1/1987 | Ciaramitaro et al. ........... 149/2 |
| 5,323,872 A | 6/1994 | Yabe .......................... 180/271 |
| 5,486,019 A | 1/1996 | Chevroulet et al. ......... 180/271 |
| 5,490,887 A | 2/1996 | Cranney et al. ............... 149/2 |
| 6,220,166 B1 * | 4/2001 | Cherry ....................... 102/306 |

FOREIGN PATENT DOCUMENTS

EP    0 805 073    11/1997

\* cited by examiner

Primary Examiner—J. Woodrow Eldred
(74) Attorney, Agent, or Firm—Sughrue Mion, PLLC

(57) ABSTRACT

A collapsible panel forming a separation structure between a generally closed inner environment and an outer environment, for instance consisting of a motorvehicle stratified window, incorporating within its mass at least one explosive charge to which an igniter/detonator device is operatively associated to produce detonation of the explosive charge so as to shiver the panel in a controlled way substantially within the plane thereof.

4 Claims, 4 Drawing Sheets

COLLAPSIBLE PANEL AND METHOD FOR CONTROLLED COLLAPSING THEREOF

Figure 1:
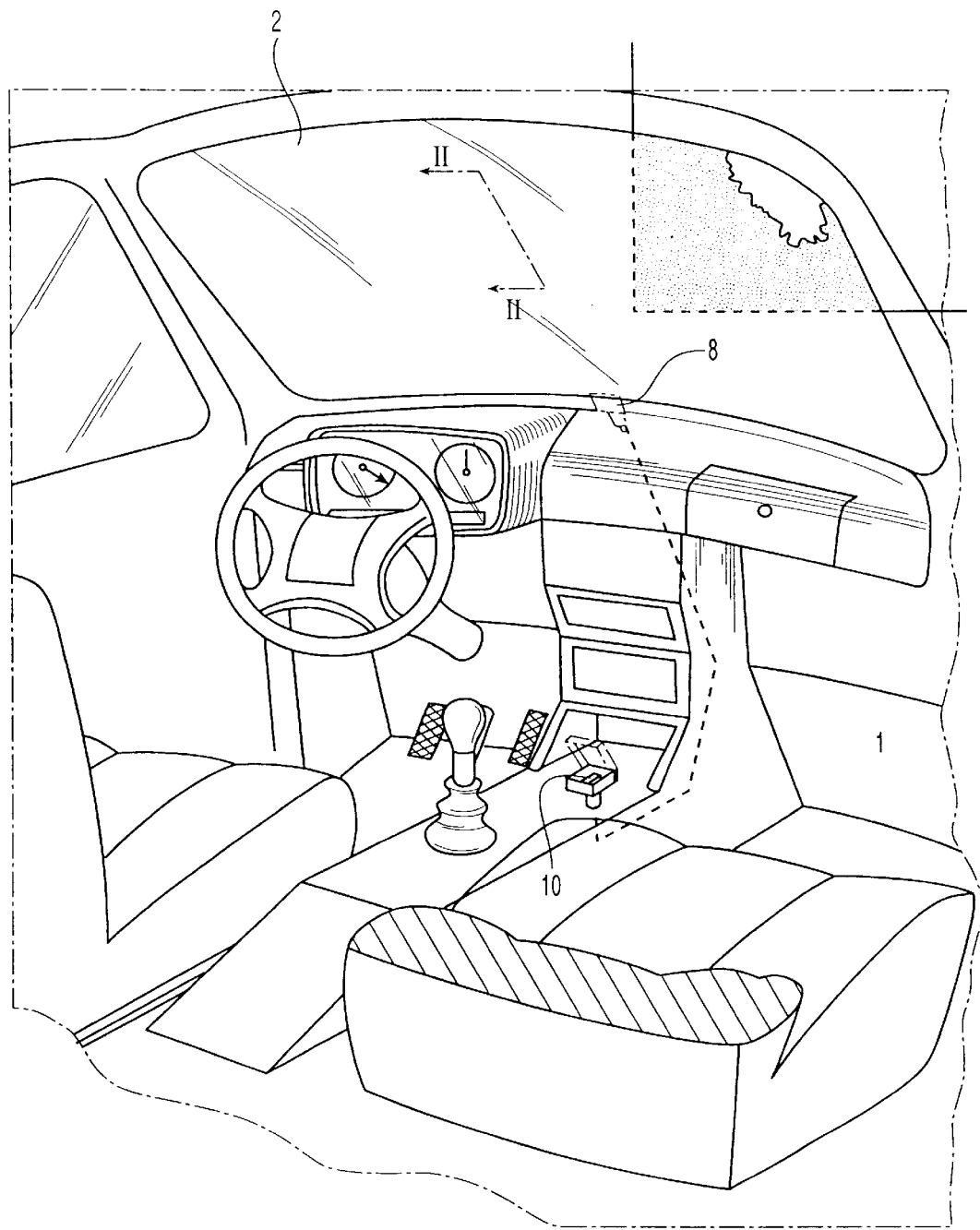

This is a divisional of application Ser. No. 09/288,498 filed Apr. 8, 1999 now U.S. Pat. No. 6,250,412, the disclosure of which is incorporated herein by reference.

The present invention is related in general to panels forming a separation structure between a generally closed inner environment and an outer environment.

In the present invention and in the appended claims the term "panel" is intended to designate any planar or even curved substantially sheet-like element, employed as a separating element between an inner and an outer environment in the fields of buildings and road and railway vehicles. Accordingly the term "panel" as used herein includes walls, partitions, diaphragms, architectural facades, plate glasses, windows, windscreens and the like which, secured to their supports, provide safety and protection from the outside, i.e. prevent intrusion of persons, objects, atmospheric agents, etc.

These panels however become in case of emergency an obstacle to the need of evacuation of people and things, for instance owing to a fire, a road or railway accident, gas leak, undesired door locking, unsufficient escape ways in case of panic, etc. When the panel consists of a window of an armoured car, generally comprising two or more sturdy glass sheets mutually joined together by a bonding agent, there is the serious problem that in case of accident or locking of the car doors and movable windows, the passengers may be trapped within the car without any chances of escape. As far as railway vehicles, for instance high-speed trains, are concerned, the window panels are held fixed and the access doors are located in critical areas, i.e. at the ends of the vehicle bodies which are most exposed to the consequences of crashes and thus to the risk of jamming. The trapping danger in case of accident is in this case evidently much higher.

In order to give a solution to the above problems, panel controlled self-elimination systems have been already proposed, providing panel collapsing by means of explosive micro-charges. The presently known proposals, with specific reference to windows for vehicles in general, substantially provide the following three solutions:

- the explosive charge, positioned at the outside or at the inside of the window, operates striking members which in turn produce embrittlement of the window (U.S. Pat. No. 5318145; EP-A-13529; FR-A-2096188; FR-A-2051580);
- the window, or a portion thereof, is circumscribed by an annular explosive string whose detonation produces window cutting or severing. This solution is particularly directed to transparent canopies of aircrafts provided with pilot's ejectable seat (U.S. Pat. No. 4,301,707; FR-A-2140605; FR-A-2125588; FR-A-2077846; U.S. Pat. No. 3670998);
- pyrotechnic charges are applied to the support structure of the panel, for instance of an aircraft emergency door, so as to provide separation and outwardly ejection thereof (U.S. Pat. No. 4407468).

The above-listed solutions are all affected by the same critical drawback: detonation of the explosive charge produces a substantially uncontrolled panel deflagration with ejection of the panel as a whole, or of portions and fragments thereof, normally towards the outside of the environment delimited by the panel itself. Panel embrittlement with fragment ejection is absolutely dangerous and unacceptable, and owing to this reason the above-disclosed known solutions have not been significantly applied until today.

The object of the present invention is to overcome the above inconveniences, and to provide a collapsible panel and a method for the controlled elimination thereof in a safe way and substantially without any risks of ejection of parts of fragments thereof towards either the outer or the inner environment.

According to the invention this object is achieved essentially by virtue of a collapsible panel of the type set forth in the above, characterised in that it embodies within at least part of the mass thereof at least one explosive charge to which igniter and/or detonator means are operatively associated to operate detonation of the explosive charge so as to shiver the panel in a controlled way substantially within the plane thereof.

The explosive charge may be arranged distributely over the panel plane, or it may be concentrated in correspondence of a weak point thereof, particularly at a corner.

In either case breakage of the panel following piloted detonation of the explosive charge provides opening of an escape passage between the inner and outer environments in a prompt and efficient way, since the panel is reduced into very little incoherent fractions. In case the panel constitutes an element of a building structure, immediate generation of a passage even of a large size enables, for instance in case of supermarkets, banks and public offices, not only to prevent any obstacle to the crowd flow outwardly, but also to ensure quicker and easier interventions by the police and fire brigade whenever necessary, also unsheltering any aggressors which might employ, once having got in, those "barriers" like barricades. Still in case the collapsible panel is constituted by a building structure element even of a large size, such as for instance a glass wall, the invention provides incorporating within the panel a retaining filiform structure designed to hold the fragments of the panel itself following detonation of the explosive charge. In practice this turns the collapsed panel into a kind of incoherent curtain which prevents piling up of glass splinters and rubbles on the ground and which can be easily passed through.

Further advantageous applications of the panel according to the invention may consist for instance of fire barriers in building blocks constituted by a large amount of premises even arranged on several floors, or in road galleries. In the event of fire, piloting even by means of a remote control and also from several locations collapsing of a wise composition of such fire barriers may enable quickly circumscribing the fire, thus safeguarding in a short time people within the interested area, and warrants their moving away and rescue.

Still another particularly advantageous application of the collapsible panel according to the invention consists of car windows (lateral windows, windscreen, rear window) of motorvehicle, and in particular of armoured cars. As it is known an armoured car window is generally constituted by two or more sturdy glass sheets mutually bonded together: in case of accident or door locking, these windows would seal the passengers within the car. To the contrary, collapsing of the windows according to the principles of the invention, following detonation of explosive charges possibly in synchronism with operation of passive inertial safety systems which the car may be equipped with, immediately provides exit passageways for the car occupants towards the outside, i.e. passageways for succourers towards the interior of the car. In this application the window has normally a stratified conformation with at least a pair of glass sheets joined together, typically by means of a transparent bonding agent. In this case the explosive charge is conveniently provided according to the invention as a thin and also transparent layer, interposed between these sheets and embodied within the bonding agent. Obviously, in case the windows is formed by more sheets mutually coupled together, the explosive layer may be embodied in correspondence of the bonding areas between each pair of adjacent sheets. Detonation of the explosive charge, started by the associated igniter and/or detonator, immediately propagates between the window sheet layers, causing embrittlement thereof.

In case of armoured tempered windows, the shock wave for collapsing thereof may be produced by an explosive micro-charge concentrated in the weakest point of the panel, i.e. as already previously pointed out at a corner where two of its edges are merging. Splinter projection shall in this case be prevented by the usual polycarbonate or polyester film provided in correspondence of the glass surface facing towards the interior of the vehicle.

Explosives which can be employed in the collapsible panel according to the invention may simply consists even of commonly employed gunpowder. In the case of windows and transparent panels in general a suitable explosive may conveniently be of the "water-gel" type which, besides being capable of activation in environments without air and even wet and underwater, is also transparent and resistant to temperature changes, namely has no instability problems due to insulation, green house effect and accidental shocks. Moreover this type of explosive is subjected neither to dulling over the time nor to detonation by sparks generated by projectile impact thereagainst.

The invention, defined in its essential elements in the appended claims, is directed besides the collapsible panel also to the method for controlled collapsing thereof.

Figure 2:
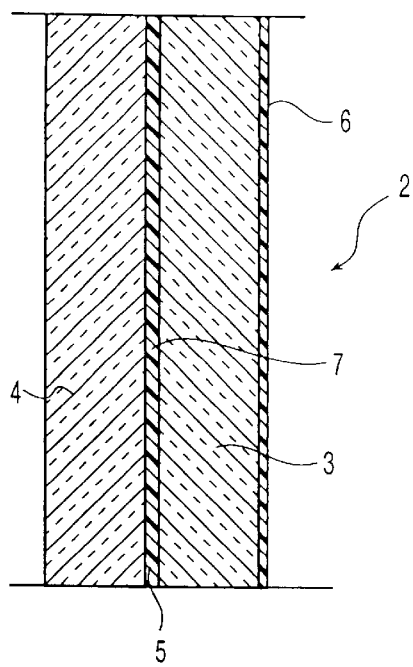
Figure 4:
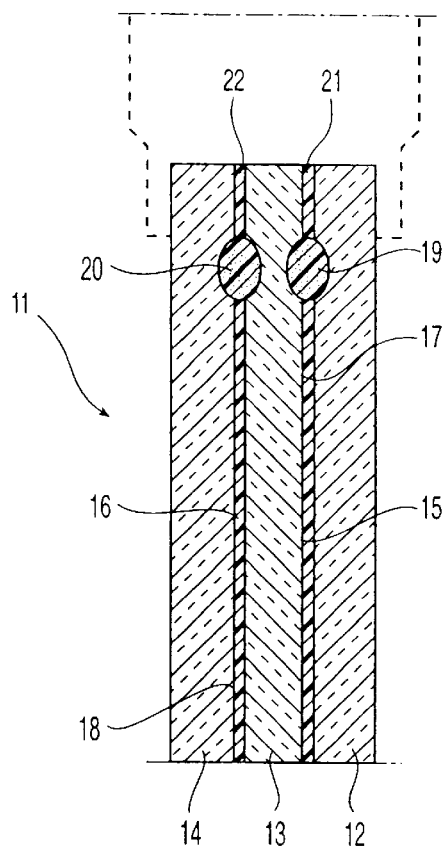
Figure 3:
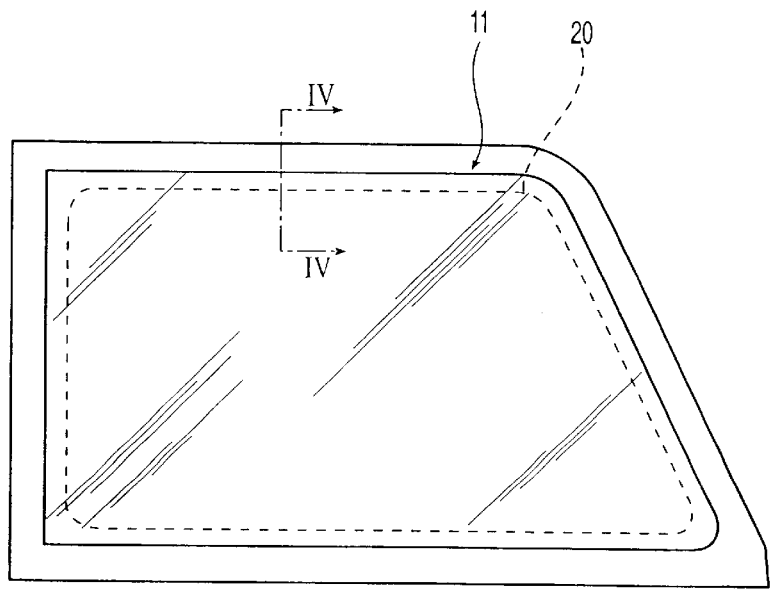
Figure 5:
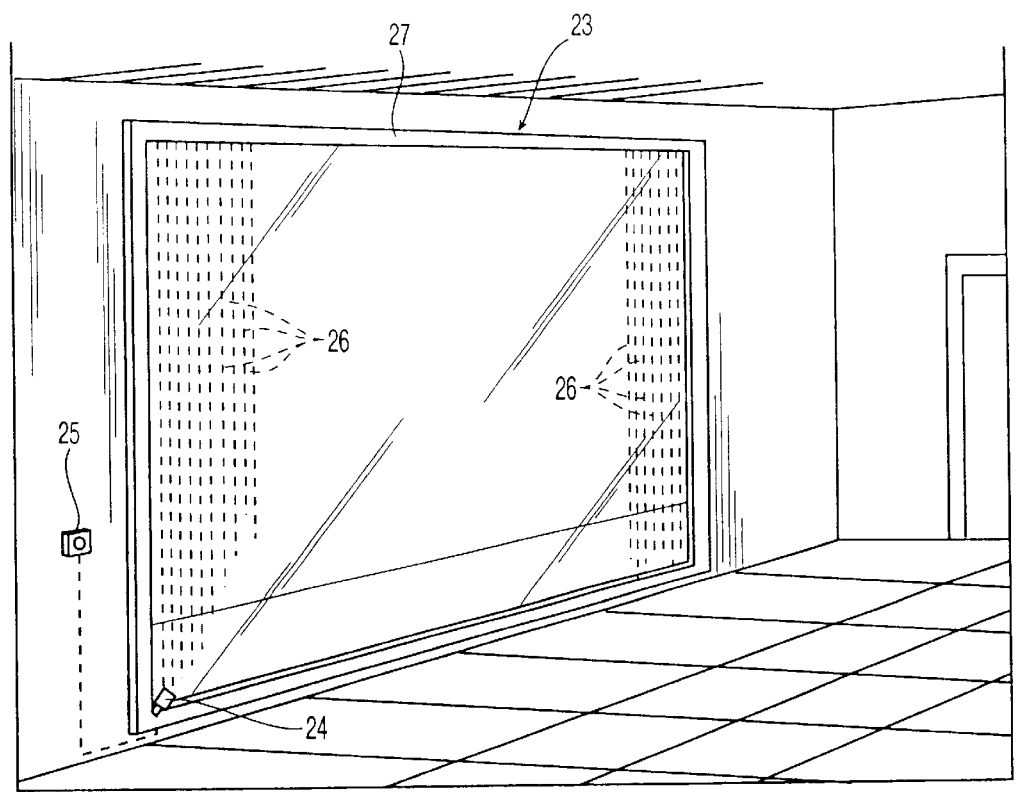
Figure 6:
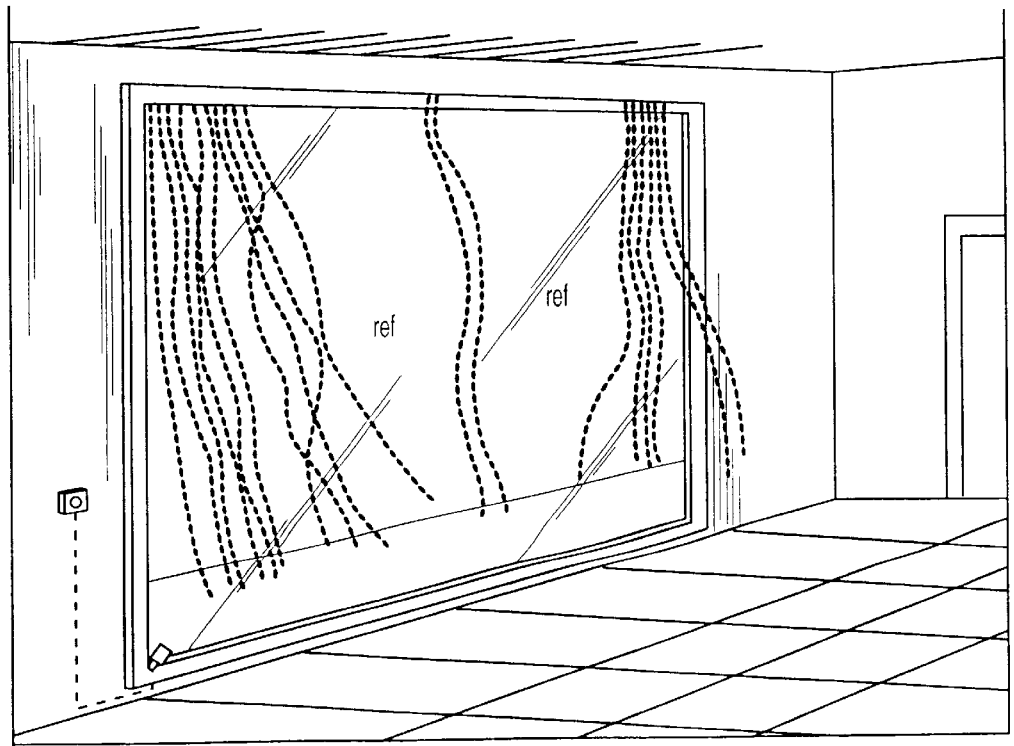
Figure 7:
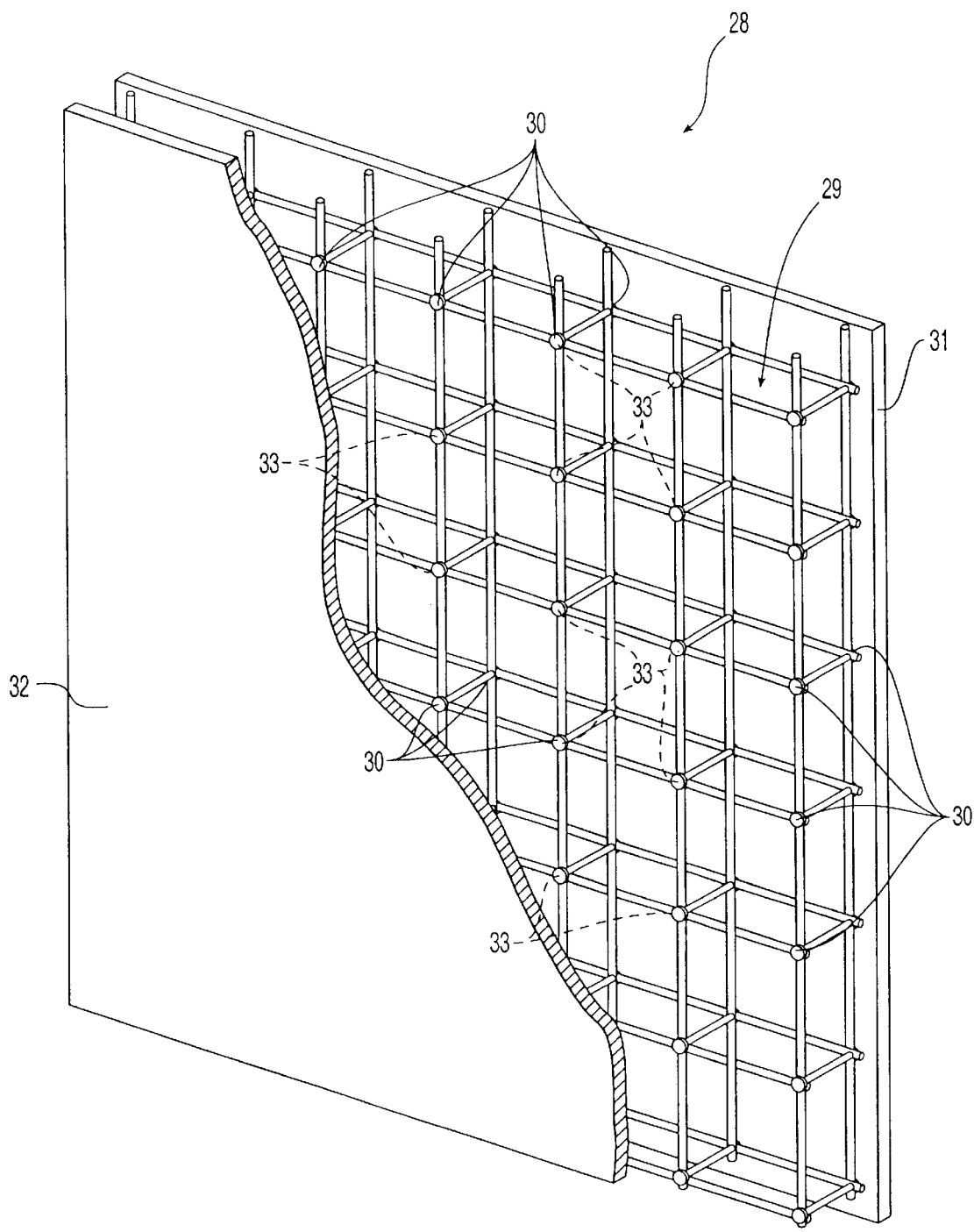

Embodiments of the invention will now be disclosed with reference to the accompanying drawings, purely provided by way of non limiting example, in which:

FIG. 1 is a diagrammatic perspective view showing the passenger compartment of an armoured car whose windscreen is constituted by a collapsible panel according to the invention, FIG. 2 is a sectioned and enlarged view along line II—II of FIG. 1, FIG. 3 is a diagrammatic elevational view of a side window of an armoured car, also constituted by a collapsible panel according to the invention, FIG. 4 is a sectioned and enlarged view along line IV—IV of FIG. 3, FIG. 5 is a diagrammatic perspective view of a building structure element, and more particularly of a glass wall, also constituted by a collapsible panel according to the invention, FIG. 6 is a view similar to FIG. 5 showing the glass wall following collapsing thereof, and FIG. 7 is a perspective and partially sectioned view of a further building structure element also consisting of a collapsible panel according to the invention.

Referring initially to FIGS. 1 and 2, reference numeral 1 designates the passenger compartment of an armoured car having a windscreen 2 formed by two sturdy glass sheets 3,4 coupled together by an intermediate layer of a bonding agent 5, in a conventional way. A transparent polycarbonate or polyester film 6 is normally applied to the surface of the inner glass sheet 3 facing towards the passenger compartment 1.

According to the invention the windshield 2 embodies within its mass an explosive charge: in the case of the shown example, i.e. in the case of two mutually coupled glass sheets, this explosive charge, shown as 7, is constituted by a uniform and transparent thin layer, incorporated within the bonding agent layer 5, of water-gel explosive, for instance of the type produced and marketed by NITROCHIMIE or by SARDA ESPLOSIVI INDUSTRIALI SPA.

In case of a multi-layer panel, i.e. in the case of windows or glass partitions formed by several sheets coupled to one another, an explosive charge 7 may be interposed between each layer of adjacent layers.

For activation of the explosive charge 7 an igniter is provided, which operates a detonator fuse of conventional type diagrammatically shown as 8 in FIG. 1, which is connected to a manually operable control device 9 provided with suitable safety protections (not shown in the drawings since within the skill of the practitioner) against accidental operation.

In case the car is equipped with inertial passive safety systems (air bag; safety belt pre-stretching device), the igniter 8 may be automatically actuated in a synchronised way with operation of these inertial systems. In this case a suitable delay device may be provided for possibly allowing de-activation of the igniter 8 by means of the manual control 10.

In case of crash or anyway of locking of the car doors, the windshield 2 according to the invention provides an immediate escape way following its controlled self-destruction upon detonation of the explosive charge 7. In this case in fact the combustion of the explosive charge rapidly propagates between the two sheets 3,4 causing micro-shivering thereof substantially within the plane of the window 2, such as partially depicted on top of the right side of the windshield 2 in FIG. 1. Ejection of any glass splinters or fragments towards the interior of the passenger compartment 1 is prevented by the inner film 6.

The explosive charge 7 may consist of usual gunpowders which, as it is known, can be activated even in the absence of air, and thus also in wet environment and underwater. The volume change caused by firing of the explosive charge and the combustion rapidity are both function of the type of selected explosive: in this connection the "water-gel" type explosive is presently considered as preferred particularly in case the collapsible panel is constituted by a vehicle window, since this explosive is transparent and resistant to temperature variations, without any instability problems, due to insulation, green house effect and accidental shocks. Moreover such an explosive does not become dull over the time and is not activated by sparks produced by any projectile impact.

Naturally in case of non-transparent panels more common and promptly available explosives can be employed, such as for instance gunpowder, laminated plastic explosive and the like.

FIGS. 3 and 4 show another example in which the collapsible panel according to the invention is transparent. In this case the panel is constituted by an armoured side window 11 of a motorvehicle, formed by three sturdy glass sheets 12,13,14 mutually coupled by means of two intermediate layers of a bonding agent 15,16 in which respective thin layers of transparent explosive 17,18 are incorporated, designed to be both activated simultaneously by means of an igniter and/or detonator not shown in the drawings. In this embodiment peripheral annular channels 19,20 may be provided between the sheets 12,13 and 13,14, respectively, housing respective explosive charges 21,22. Upon explosion of the charges 17,18, detonation of the annular charges 21,22 releases the window 11 thus collapsed from the vehicle structure to the aim of providing a fully open passageway from the interior of the passenger compartment outwardly and viceversa.

The same effect can be more conveniently achieved through provision of a greater thickness of the or each explosive charge 17,18 along the peripheral border of the window 11, which enables—besides detachment of the collapsed window from its support—making the explosion propagation speed more regular and fast.

It is to be pointed out that in case of armoured tempered glass panels the shock wave for collapsing thereof may be generated, instead of an explosive charge distributed through the panel thickness over its plane, by a micro-charge concentrated in the weakest point of the structure, i.e. at the merging zone of two of its edges.

FIGS. 5 and 6 show another exemplary embodiment of the invention, in which the collapsible panel consists of a glass wall 23 of a building structure, for instance of a public office. Also in this case collapsing of the glass wall 23 may conveniently be operated by a distributed (in case of multilayer construction) or concentrated in correspondence of one corner (in case of single-layer tempered construction) explosive charge, which is transparent and designed to be fired by an igniter and/or detonator 24 in turn manually operable by means of a control member 25.

The glass wall 23 conveniently incorporates a filiform structure, formed by a plurality of vertical threads 29 connected superiorly to the frame 27 of the glass wall 23 and capable to hold, after detonation of the explosive charge, the glass fragments such as diagrammatically depicted in FIG. 6, as to form a kind of incoherent curtain thus avoiding piling up of glass shivers on the ground.

FIG. 7 shows a further application of the invention to a reinforced non-transparent panel for building construction, generally indicated as 28. This panel 28 comprises an inner load bearing structure 29 which can be bidimensional or, as in the case of the shown example, tridimensional with structural nodes 30, and two sheets 31,32 fixed to the load bearing structure 29. Even in this case the explosive is provided within the mass of the panel 28, and is constituted more particularly by concentrated charges 33 arranged in correspondence of the structural nodes 30. The explosive charges 33 shall also be activated through one or more igniter/detonators in turn designed to be piloted by means of one or more manual controls.

Such a panel can be advantageously employed for the manufacturing of collapsible wall structures, doors, bulkheads and the like, to the aim of providing, in case of need, large passageways capable to safely warrant escape from the inner environment towards the outer environment and immediate access from the outside towards the inner environment.

It is to be pointed out that the embodiments disclosed with reference to the drawings only constitute a limited number of possible applications of the invention, whose practical working can be advantageously extended to any separation structure between one and another environments.

In case of application to a collective transportation vehicle, for instance a bus or a railway body, all windows thereof may consist of transparent panels according to the invention, pre-mounted within respective metal or plastic material frames in turn fixed to the vehicle structure, each frame carrying an igniter device for the explosive charge embodied in the respective windows. These igniter devices may also be designed to be simultaneously actuated, both from the interior and from the outside of the vehicle, by means of a suitable key-tool designed to be inserted into a well visible and accessible operating socket. Accordingly escape of the passengers outwardly and entrance of rescue people inwardly of the vehicle shall be immediate and through a number of passageways simultaneously.

Additional examples of advantageous embodiments of the invention may consist of submerged swing doors and diaphragm which cannot open owing to piezometric load, designed to be collapsed so as to perform the task of quick opening safety valves to prevent damages of hydraulic plants (for instance of a hydroelectric installation) in case of anomalous overpressure. Further embodiments may consist of walls or windows or large doors with piloted function of anti-panic collapsing. Naturally the details of construction and the embodiments may be widely varied with respect to what has been disclosed and illustrated, without thereby departing from the scope of the present invention such as defined in the appended claims.

What is claimed is:

1. A method for eliminating a collapsible panel forming a separation structure between a generally closed inner environment and an outer environment, said method comprising the following steps:

providing within at least part of a plane of a panel at least one explosive charge;

piloting detonation of said explosive charge so as to shiver said panel substantially within said plane; and incorporating within the panel filiform retainer structure means designed to hold the panel fragments following detonation of said explosive charge.

2. A method for eliminating a collapsible panel forming a separation structure between a generally closed inner environment and an outer environment, said method comprising the following steps:

providing within at least part of a plane of a panel at least one explosive charge;

piloting detonation of said explosive charge so as to shiver said panel substantially within said plane;

wherein said panel is a building structural element.

3. A collapsible panel forming a separation structure between a generally closed inner environment and an outer environment, said panel comprising:

a planar member;

at least one explosive charge to which igniter/detonator means is operatively associated to operate detonation of said explosive charge so as to shiver said planar member in a controlled way substantially within a plane of said planar member; and a retainer filiform structure means incorporated within the plane of said planar member to hold planar member fragments following detonation of said explosive charge.

4. A collapsible panel forming a separation structure between a generally closed inner environment and an outer environment, said panel comprising:

a planar member;

at least one explosive charge to which igniter/detonator means is operatively associated to operate detonation of said explosive charge so as to shiver said planar member in a controlled way substantially within a plane of said planar member;

wherein said planar member is a building structural element.

* * * * *